United States Patent
Virtej et al.

(10) Patent No.: US 9,313,702 B2
(45) Date of Patent: Apr. 12, 2016

(54) ADAPTATION OF MOBILITY PARAMETERS BASED ON USER EQUIPMENT MEASUREMENT AVAILABILITY

(71) Applicant: Nokia Corporation, Espoo (FI)

(72) Inventors: Elena Virtej, Espoo (FI); Lars Dalsgaard, Oulu (FI); Jari Petteri Lunden, Espoo (FI)

(73) Assignee: NOKIA CORPORATION, Espoo (FI)

( * ) Notice: Subject to any disclaimer, the term of this patent is extended or adjusted under 35 U.S.C. 154(b) by 0 days.

(21) Appl. No.: 14/381,288

(22) PCT Filed: Mar. 20, 2013

(86) PCT No.: PCT/FI2013/050309
§ 371 (c)(1),
(2) Date: Aug. 27, 2014

(87) PCT Pub. No.: WO2013/144433
PCT Pub. Date: Oct. 3, 2013

(65) Prior Publication Data
US 2015/0119039 A1 Apr. 30, 2015

Related U.S. Application Data

(60) Provisional application No. 61/615,568, filed on Mar. 26, 2012.

(51) Int. Cl.
*H04W 36/00* (2009.01)
*H04W 24/10* (2009.01)

(52) U.S. Cl.
CPC .......... *H04W 36/0083* (2013.01); *H04W 24/10* (2013.01); *H04W 36/0088* (2013.01)

(58) Field of Classification Search
CPC ............ H04W 24/10; H04W 36/0094; H04W 36/0083

USPC ................................................. 455/436, 441
See application file for complete search history.

(56) References Cited

U.S. PATENT DOCUMENTS 7,460,869 B2 * 12/2008 Pekonen ............... H04W 24/10
455/436
2006/0205406 A1 9/2006 Pekonen et al.
(Continued)

FOREIGN PATENT DOCUMENTS

EP 1944985 7/2008
EP 2360960 8/2011
(Continued)

OTHER PUBLICATIONS

"New Work Item Proposal for LTE RAN Enhancements for Diverse Data Applications", 3GPP TSG RAN Meeting #51, RP-110454, Agenda Item: 14.1, Mar. 15-18, 2011, 7 pages.
(Continued)

*Primary Examiner* — Qutbuddin Ghulamali
(74) *Attorney, Agent, or Firm* — Squire Patton Boggs (US) LLP

(57) ABSTRACT

Methods, apparatuses, a non-transitory computer-readable medium and system are provided for adaptation of mobility parameters based on user equipment measurement. A method may include determining at least one of measurement rate or measurement availability (413); and adapting at least one of an event triggering or a measurement filtering, depending on at least one of the measurement rate or the measurement availability (415). A method may further include adapting one or more mobility parameters based on measurement availability or measurement rate (415); and communicating the rules or adaptations to the rules to a user equipment (420). In some example embodiments, the methods are used for making handover decision or causing a report to be sent from a user equipment.

18 Claims, 11 Drawing Sheets

(56) References Cited

U.S. PATENT DOCUMENTS

| | | | | |
|---|---|---|---|---|
| 2010/0120429 A1* | 5/2010 | Kazmi | ............... | H04W 36/30 455/436 |
| 2010/0234014 A1 | 9/2010 | Virkki et al. | | |
| 2010/0298001 A1* | 11/2010 | Dimou | ............... | H04L 67/02 455/441 |

FOREIGN PATENT DOCUMENTS

| | | | |
|---|---|---|---|
| WO | 2007/110746 | A2 | 10/2007 |
| WO | 2009/030289 | A1 | 3/2009 |
| WO | 2009/073525 | A1 | 6/2009 |
| WO | 2010053425 | A2 | 5/2010 |
| WO | 2011041753 | A2 | 4/2011 |
| WO | 2011069550 | | 6/2011 |
| WO | 2011/136716 | A1 | 11/2011 |
| WO | 2011138494 | A1 | 11/2011 |
| WO | 2012034583 | | 3/2012 |

OTHER PUBLICATIONS

"Revised WID on Study for Hetnet Mobility Enhancements for LTE", 3GPP TSG-RAN Meeting #52, RP-110709, Agenda Item: 12.11, May 31-Jun. 2011, 6 pages.

"3rd Generation Partnership Project; Technical Specification Group Radio Access Network; Evolved Universal Terrestrial Radio Access (E-UTRA); Radio Resource Control (RRC); Protocol Specification (Release 9)", 3GPP TS 36.331, v9.5.0, Dec. 2010, pp. 1-252.

"3rd Generation Partnership Project; Technical Specification Group Radio Access Network; Evolved Universal Terrestrial Radio Access (E-UTRA); Requirements for Support of Radio Resource Management (Release 10)", 3GPP TS 36.133, v10.5.0, Dec. 2011, pp. 1-544.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)", 3GPP TS 36.300, v11.0.0, Dec. 2011, pp. 1-194.

"3rd Generation Partnership Project; Technical Specification Group Radio Access Network; Evolved Universal Terrestrial Radio Access (E-UTRA); Medium Access Control (MAC) Protocol Specification (Release 10)", 3GPP TS 36.321, v10.4.0, Dec. 2011, pp. 1-54.

"3rd Generation Partnership Project; Technical Specification Group Radio Access Network; Evolved Universal Terrestrial Radio Access (E-UTRA); Physical Layer; Measurements (Release 10)", 3GPP TS 36.214, v10.1.0, Mar. 2011, pp. 1-13.

3rd Generation Partnership Project;Technical Specification Group Radio Access Network; Evolved Universal Terrestrial Radio Access (E-UTRA);Radio Resource Control (RRC);Protocol specification (Release 9), 3GPP TS 36.331 V9.8.0 (Sep. 2011).

International Search Report and Written Opinion received for corresponding Patent Cooperation Treaty Application No. PCT/FI2013/050309, dated Jul. 5, 2013, 14 pages.

Nokia Corporation, Nokia Siemens Networks, "HetNet Mobility and DRX", 3 GPP TSG-RAN WG2 Meeting #77, R2-120108, Feb. 6-10, 2012, pp. 1-11.

European Search Report application No. 13769781.9 dated Nov. 26, 2015.

* cited by examiner

```
-- ASN1START

ReportConfigEUTRA ::=            SEQUENCE {
    triggerType                      CHOICE {
        event                            SEQUENCE {
            eventId                          CHOICE {
                eventA1                          SEQUENCE {
                    a1-Threshold                     ThresholdEUTRA
                },
                eventA2                          SEQUENCE {
                    a2-Threshold                     ThresholdEUTRA
                },
                eventA3                          SEQUENCE {
                    a3-Offset                        INTEGER (-30..30),
                    a3-Offset-2                      INTEGER (-30..30),
                    reportOnLeave                    BOOLEAN
                },
                eventA4                          SEQUENCE {
                    a4-Threshold                     ThresholdEUTRA
                },
                eventA5                          SEQUENCE {
                    a5-Threshold1                    ThresholdEUTRA,
                    a5-Threshold2                    ThresholdEUTRA
                },
                ...
            },
            hysteresis                       Hysteresis,
            timeToTrigger                    TimeToTrigger
            timeToTrigger2                   TimeToTrigger
        },
        periodical                       SEQUENCE {
            purpose                          ENUMERATED {
                                                 reportStrongestCells, reportCGI}
        }
    },
    triggerQuantity                  ENUMERATED {rsrp, rsrq},
    reportQuantity                   ENUMERATED {sameAsTriggerQuantity, both},
    maxReportCells                   INTEGER (1..maxCellReport),
    reportInterval                   ReportInterval,
    reportAmount                     ENUMERATED {r1, r2, r4, r8, r16, r32, r64, infinity},
    ...,
    [[ si-RequestForHO-r9             ENUMERATED {setup}    OPTIONAL,    -- Cond reportCGI
       ue-RxTxTimeDiffPeriodical-r9   ENUMERATED {setup}    OPTIONAL,    -- Need OR
    ]]
}

ThresholdEUTRA ::=               CHOICE{
    threshold-RSRP                   RSRP-Range,
    threshold-RSRQ                   RSRQ-Range,
    threshold-RSRP-2                 RSRP-Range,
    threshold-RSRQ-2                 RSRQ-Range
}

-- ASN1STOP
```

Figure 5

ADAPTATION OF MOBILITY PARAMETERS BASED ON USER EQUIPMENT MEASUREMENT AVAILABILITY

RELATED APPLICATION

This application was originally filed as PCT Application No. PCT/FI2013/050309 filed Mar. 20, 2013 which claims priority benefit from U.S. Application No. 61/615,568, filed Mar. 26, 2012.

BACKGROUND

1. Field

The long term evolution (LTE) of the third generation partnership project (3GPP), and particularly heterogeneous network (HetNet) mobility and enhancements for diverse data applications (EDDA) may benefit from adaptable mobility parameters. More specifically, adaptation of mobility parameters based on user equipment measurement characteristics, such as measurement availability, can be applied in these areas, among others.

2. Description of the Related Art

Enhancements for diverse data applications (EDDA) can cover various applications and interrelationships. One such related area is the area of discontinuous reception (DRX). For example, enhancements may be made to DRX configuration/control mechanisms to be more responsive to the needs and activity of either single or multiple applications running in parallel, with improved adaptability to time-varying traffic profiles and to application requirements, thereby allowing for an improved optimization of the trade-off between performance and user equipment (UE) battery consumption.

Moreover, robust mobility functionality under various supported assumptions for the availability of user equipment measurements can be ensured or taken into account, as well as user equipment power consumption and complexity. 3GPP technical specification (TS) 36.331 describes radio resource control (RRC) connected mode handover mobility and 3GPP TS 36.133 describes user equipment minimum performance requirements including performance requirements related to measurements in RRC connected mode with and without DRX, both of which are incorporated herein by reference in their entirety.

BRIEF DESCRIPTION OF THE DRAWINGS

For proper understanding of the invention, reference should be made to the accompanying drawings, wherein:

FIG. 5 illustrates reporting configuration according to certain embodiments.

DETAILED DESCRIPTION

Figure 1A:
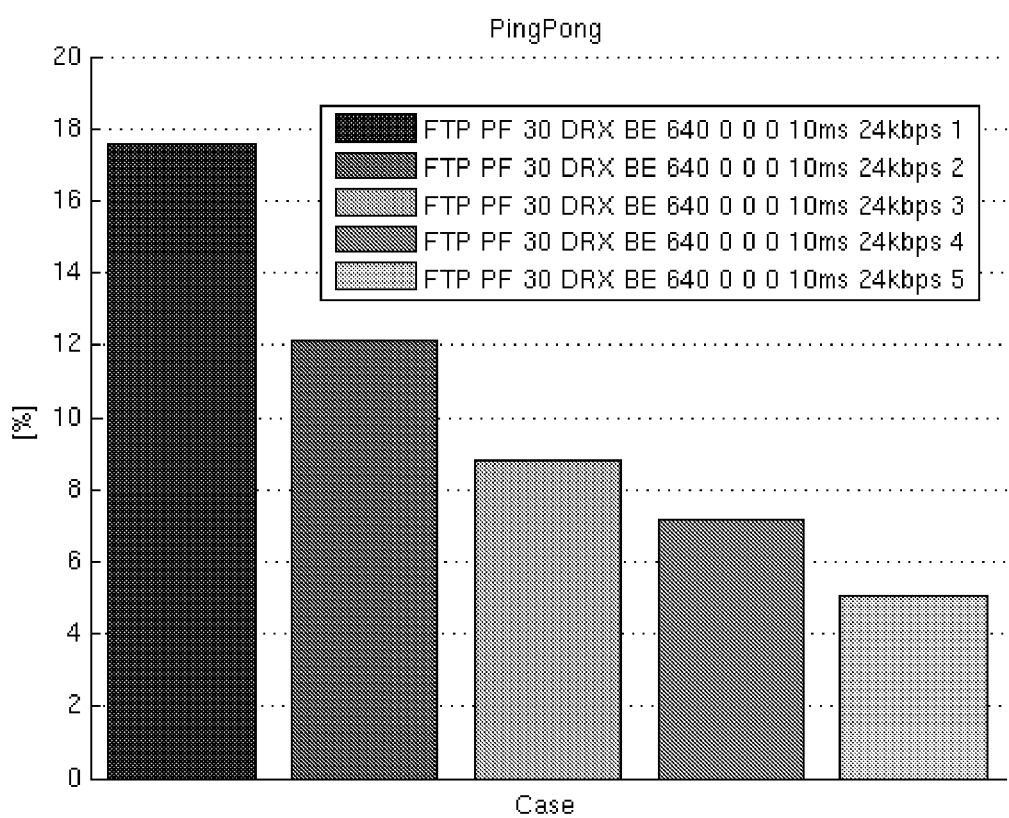
FIG. 1A illustrates occurrence of ping pong handovers and FIG. 1B illustrates occurrence of radio link failure when a user equipment (UE) has high traffic.

In smart phones and other communication devices, the traffic activity may vary considerably. At some point of time the user may have an active browsing session, or even a real-time video conference, whereas at the next moment, such as when the browsing or conference ends, there may be only background traffic consisting of relatively infrequent updating of emails, weather forecast widgets, or the like. This variation in use of the device can cause a lot of variation in the traffic to and from the device. Therefore, the UE can be configured with DRX to allow power saving when there is no traffic.

DRX can cause unpredictability in handover measurements. In particular, DRX can cause unpredictability because measurement requirements and reporting criteria can differ according to the length of the DRX cycle length or interval. Thus, long DRX cycles or intervals may have more relaxed requirements. In long term evolution (LTE), the UE measurement requirements with DRX are roughly based on an assumption that the UE measures only during the DRX on-duration, namely once per DRX cycle. However, the UE may measure more frequently than required, for example, when there is a lot of traffic and it is monitoring the physical downlink control channel (PDCCH) and consequently has its receiver on anyway.

Simulation studies illustrate the phenomenon that long DRX can cause irregularities with mobility, as shown in FIGS. 1A, 1B, 2A, and 2B, if the DRX opportunities are used by the UE and no measurements are performed when in DRX, for example, when the UE is not required to receive physical downlink control channel (PDCCH). These irregularities can be because long delays in measurements produce delays to the handovers, which show as radio link failures (RLFs) or handover failures.

Keeping the UE in connected mode with long DRX is one approach for handling the background traffic of smart phones without compromising power saving or experienced quality of service. Connected mode DRX can lead to significant power savings for UEs having infrequent UL/DL transmissions, as compared to not entering DRX at all. However, with long DRX the UE measurement requirements are more relaxed, which may in some cases reduce the mobility robustness. Currently, UE measurement requirements are specified such that the UE is in practice only required to perform measurements roughly at a rate depending on the length of the DRX cycle. In practice, this may mean that to fulfill the requirements the UE only needs to perform measurements once per DRX cycle, which can be during the on-duration. However, when the UE is actively scheduled with UL/DL data in a frequent or continuous manner the UE can typically also perform frequent or continuous mobility measurement and can consequently have good measurements available for mobility event evaluation. On the other hand, when DRX is applied and the UE receiver is allowed to be powered off, for example due to a temporary stop or gap in the user data flow, uplink (UL)/downlink (DL) data transmission, the UE may not/will not perform continuous measurements. Instead, the UE may perform measurements only according minimum requirements, for example, following the requirements depending on DRX rules. UE may also measure only according to the minimum requirements, for example infrequently, even if it has active traffic. Similarly, even if the UE has no or little traffic it may measure during the DRX opportunity possibly more frequently than required by the specification or measurement configuration received from the network. Also, how often the UE measures may be irregular and change quickly, for example, from one DRX cycle to another. Of course, these requirements are according to agreed standards, and can change. Thus, these are not requirements in order to practice certain embodiments.

Figure 1B:
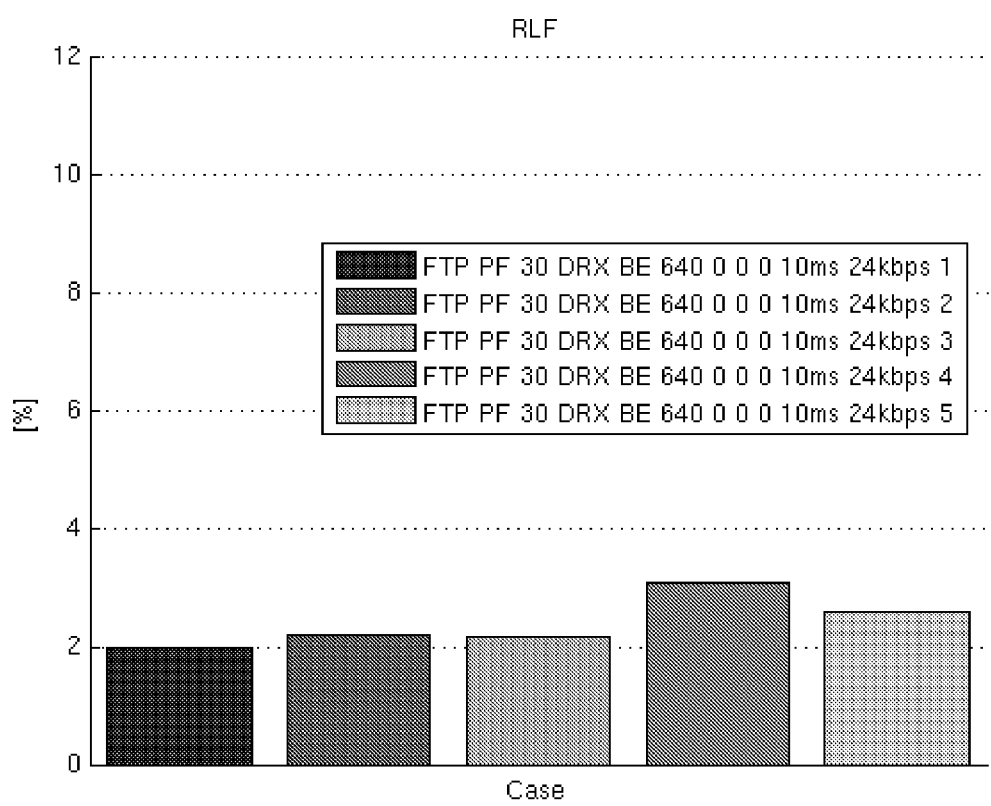

FIG. 1A illustrates ping pong (handovers) and FIG. 1B illustrates radio link failure when a user equipment (UE) has high traffic, which can correspond to being scheduled very often and therefore the UE is performing mobility measurements and evaluation rather frequently. In this case, filtering of measurements can be used in order to avoid an increase in the amount of ping pong handovers. Ping pong handovers can refer to a situation in which a UE makes a handover from a source cell to a target cell and then subsequently another handover back to the original source cell within a short time. The short time may be, for example, in the simulation results, 1 second. Parameters used in the illustrated simulation are as follows: on-duration value of 5 ms, inactivity timer value of 10 ms, measurement filtering value of 1-5 samples, and new packets generated every 10 ms. In the simulations these parameters generated a UE behavior where the UE is in DRX active time on average 120-130 ms per DRX cycle of 640 ms.

Thus FIG. 1 illustrates a high measurement availability case, in which a macro-pico HetNet including 21 macro cells, 3 pico cells, 300 users was simulated with constant bit rate traffic, having 10 ms packet interval and 24 kbps data rate, and with long DRX cycle of 640 ms. The exemplified speed case was for a device travelling at 30 km/h. The two figures respectively illustrate the radio link failures (RLFs), FIG. 1A, and ping-pong handover levels, FIG. 1B. The averaging window is represented by the number of averaged samples, which could vary from 1 up to 5.

Figure 2A:
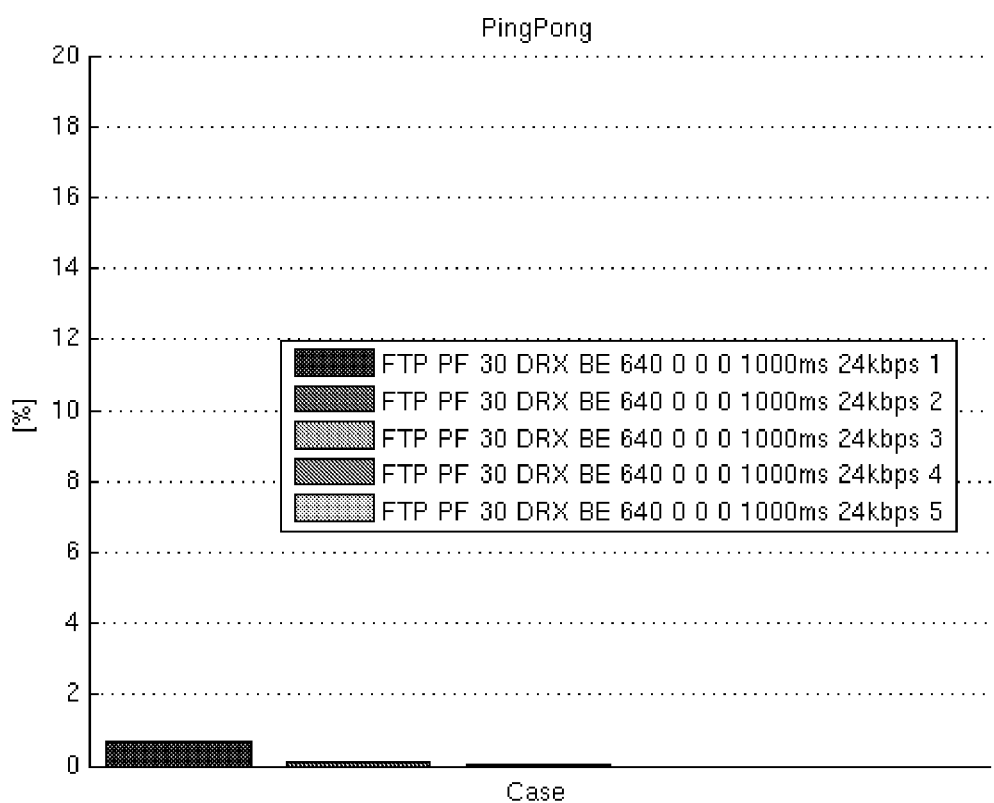
FIG. 2A illustrates occurrence of ping pong handovers and FIG. 2B illustrates occurrence of radio link failure when a user equipment (UE) has low traffic.
Figure 2B:
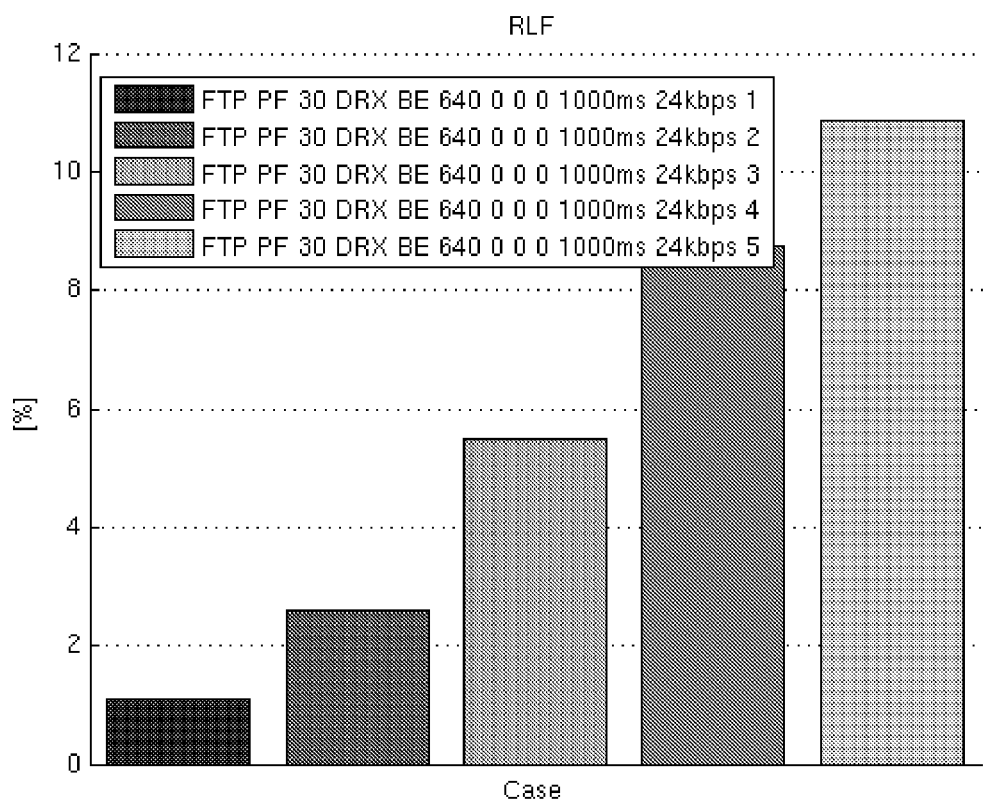

FIG. 2A illustrates occurrence of ping pong handovers and FIG. 2B illustrates occurrence of radio link failure when a user equipment (UE) has low traffic. Thus, in these figures relate to UE that is not scheduled very often and is performing measurements infrequently and irregularly. Here, the UE is performing measurements according to minimum requirements and thus has, on average, fewer measurements available for mobility evaluation per time compared to the UE in FIGS. 1A and 1B. Therefore, in order not to trigger RLF, the filtering applied can be short. In this case, having short filtering does not have a negative impact on the ping-pong handover (HO) rate, because there is a longer interval between measurement samples.

FIGS. 2A and 2B, therefore, illustrate a low measurement availability case in which a macro-pico HetNet includes 21 macro cells, 3 pico cells, and 300 users. In this scenario, there is constant bit rate traffic, having 1 s packet interval and 24 kbps data rate, with long DRX cycle of 640 ms. The exemplified speed case in this simulation was for 30 km/h. The two figures respectively illustrate the radio link failures (RLFs), FIG. 2B, and ping-pong handover levels, FIG. 2A. The averaging window is represented by the number of averaged samples, which could vary from 1 up to 5.

The simulation figures illustrate that the optimal averaging of measurements can depend on UE measurement availability and/or rate. In the figures, the UE is doing measurements only when not in DRX, that is, when the receiver is active due to PDCCH monitoring according to DRX rules. Therefore, there are more measurement samples per time unit in the high traffic case, 10 ms packet interval shown in FIGS. 1A and 1B, than in the lower traffic case, 1 s packet interval shown in FIGS. 2A and 2B. This is because in the high traffic case the UE receiver is active in a more continuous manner, and thus the UE can perform more measurements, as long as the UE receiver is on, thereby increasing the accuracy of the measurements and reducing the measurement delay.

On the other hand, for a low traffic case the UE is performing measurements rather infrequently, roughly once per DRX cycle, as required at minimum. In this case the best overall handover performance is obtained with short filtering of, for example, 2 samples due to decrease in mobility delay. In contrast, in high measurement availability cases like those of FIGS. 1A-1B, short filtering can lead to more ping-pong handovers, due to lack of filtering in time. For the high availability case filtering 5 samples may be a good setting, in that it removes impact from for example fast fades, while long filtering on the other hand can cause a high number of RLFs for a low availability case.

The reason for these differences is the different measurement interval between the cases. In the low availability case, the UE is using the DRX opportunities and measuring only once per DRX cycle, thus optimizing the power saving and measuring according to minimum requirements, whereas in the high availability case the UE does measurements more frequently and has many more measurement samples available.

Accordingly, certain embodiments provide a method in which the applied measurement filtering, and/or the need for filtering, depends on the availability of measurements over time. This method can take into account the flexible scheduling possibilities as well as continue to ensure enabling of UE power savings.

Thus, certain embodiments can address the situation in which, with DRX for example, varying measurement rate makes triggering of events, such as handovers, or sending of measurement reports based on triggered events from UE to network prone to errors. Certain embodiments can address this situation by adaptively using a different event triggering depending on measurement rate and/or availability.

Thus, in certain embodiments, a user equipment can adjust, either autonomously or under guidance of the network, the mobility parameters based on the measurement rate/availability.

Measurement availability, with DRX, can be irregular depending on when exactly within the DRX cycle UE happens to be active and/or happens to measure. So measurement availability can be an indication of how many (for example, recent) measurements are currently available for making a decision with respect to event triggering, for events such as handover or sending of a measurement report.

In one example case, measurement filtering values depend on the amount of available measurements per time window. Measurement availability could, by using E-UTRAN as example, depend on the applied DRX state.

In another example case, the event triggering is adjusted according to currently applied DRX status. In practice, the triggering level, which is based on the measured and potentially filtered quantity, for example reference signal received power (RSRP) and/or reference signal received quality (RSRQ) on the UE side for sending a measurement report, can be adjusted according to measurement rate/availability. Thus, the UE can adjust, based on specific rules, the entry and possibly leaving conditions for configured events.

More specifically, certain embodiments involve determining a number of a plurality of measurements available for making a handover decision and adapting a filtering value/ measurement report trigger value/threshold value/time to trigger value/hysteresis value in dependence of said number.

The number of a plurality of measurements available can be measured over a fixed time duration. Likewise, the number of a plurality of measurements available can be measured over one or more DRX cycles.

In E-UTRAN RRC Connected mode the UE may at some points in time be doing frequent measurements while at other points in time the UE can, for example, have longer periods of inactivity where the UE is actively applying DRX, such as having long sleep opportunities, and thus possibly measuring less frequently. The UE can be configured with DRX according to 3GPP TS 36.331. The details of the DRX configuration possibilities for RRC Connected mode are described in 3GPP TS 36.300 and 3GPP TS 36.331 while 3GPP TS 36.321 defines the basic requirements on how the UE shall monitor the PDCCH accordingly. These specifications are incorporated herein by reference in their entirety, but are not limiting on certain embodiments. Thus, it is not required that certain embodiments comply with 3GPP specifications.

Performance requirements describing the minimum UE performance including, for example, measurements performed by UE in RRC Connected mode are described in 3GPP TS 36.133, including both requirements for non-DRX and DRX cases. Here, the minimum requirements follow the configured and applied DRX in order to enable maximum UE power savings. In general, these requirements state that when the UE is continuously monitoring the PDCCH the UE shall perform frequent measurements while a UE applying DRX may apply less strict measurements following the DRX awake periods for increased/maximized UE sleep and thereby increased power savings. Details can be seen from 3GPP TS 36.133. This specification is also incorporated herein by reference in its entirety, but is not limiting on certain embodiments. Thus, as noted above, it is not required that certain embodiments comply with 3GPP specifications.

The rules by which the mobility measurement parameters are used to adapt the mobility parameters can be, for example, according to the following listed steps. In the following, E-UTRAN has been used as an example case, but certain embodiments can apply to other systems.

Figure 3:
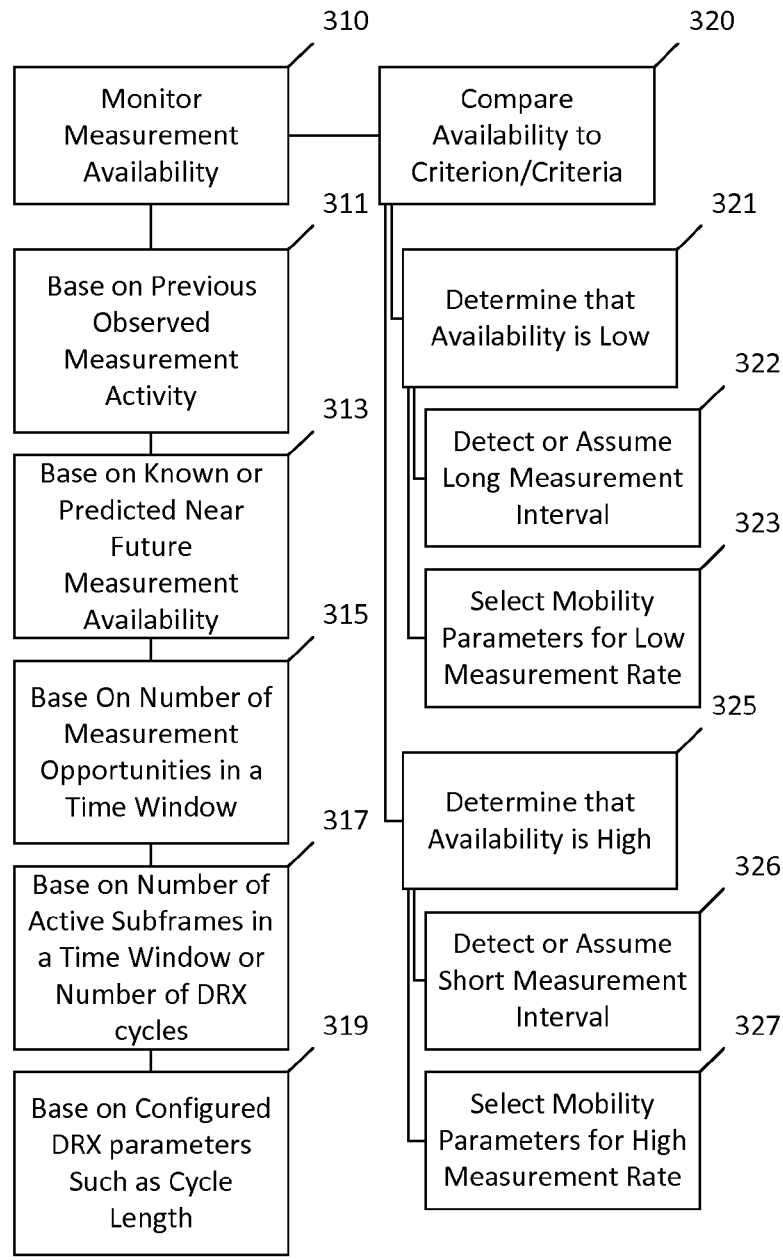
FIG. 3 illustrates a method according to certain embodiments.

FIG. 3 illustrates a method according to certain embodiments. The method of FIG. 3 may be performed by, for example, a user equipment. As shown in FIG. 3, at 310, the UE can monitor measurement availability based on one or more of the following. For example, the monitoring can be based on, 311, previously observed measurement activity. For example, the previously observed measurement activity can include the number of measurements the UE has done during a certain time window, for example a configured length such as 640 ms, or a length related to DRX cycle such as the previous one or more DRX cycles. The number of DRX cycles can be specifically an integer number of DRX cycles. In some embodiments the length of the time window and/or threshold between high and low measurement availability may depend on the event that is being evaluated: for example, different events may be associated with different time windows and/or different thresholds.

Additionally, or alternatively, the monitoring can be based on, 313, known or predicted near-future measurement availability. For example, it can be based on how many measurements the UE knows or predicts the UE will have within a certain time, for example until the next DRX cycle starts, or until the next measurement event evaluation. In another option, at 315, the monitoring can be based on how many measurement opportunities have there been during a certain time window.

Moreover, another option is that the monitoring can be based on, at 317, the number or ratio of active subframes, those subframes when the receiver is on, or UE is monitoring PDCCH and/or performing/able to perform measurements, the UE has had during the one or more previous DRX cycles or specified time window. In a further option, at 319, the monitoring can be based on configured DRX parameters, such as, for example, cycle length.

The measurement availability can be compared to a criterion/criteria at 320. Based on the outcome of the measurement availability determination, such as whether it is below or above a threshold, various actions can be taken.

For example, at 321, it can be determined that a low number of measurements is available. Thus, for example at 322, a long measurement interval can be detected or assumed, such as once per DRX cycle on-duration. The user equipment can then, at 323, select mobility parameters optimized for low measurement availability/rate. For example, the user equipment can apply a short measurement averaging window for the handover evaluation, or for other event evaluation or for filtering of measurement samples in general. Fewer samples are, in certain embodiments, obtained per time unit, and therefore a shorter sliding window is applied in order to keep the triggering delay reasonable. Possibly, the user equipment can also apply a larger threshold or hysteresis value for handover, which is configured to compensate for decreased accuracy while still enabling quick reaction.

Alternatively, the UE can determine, at 325, that a high number of measurements are available. For example, at 326, the UE can detect or assume a short measurement interval. The short measurement interval may be, for example, more often than once per DRX cycle on-duration, such as once per every 40 ms. Then, at 327, the user equipment can select mobility parameters optimized for a frequent or continuous measurement availability/rate. For example, the UE can apply a long measurement averaging window for the handover evaluation. The more measurement samples available within certain time window, previously and/or predicted near term future, the more measurements can be available for averaging per time. Thus, a more accurate result can be provided. Moreover, the sliding window filter can be longer, but also possibly a smaller threshold or hysteresis value can be applied for triggering handover, for example due to more precise measurement results. In some cases, the measurement averaging window length, in time, can also be the same as in case with low number of measurements available, but the number of samples obtained within the window can vary.

The information about what the user equipment selected as mobility parameters optimized for either a frequent or continuous measurement availability/rate or low measurement availability/rate may be indicated, for example signaled to the eNB, as well. Different mobility parameter set may be also used for regular and irregular measurement availability.

Figure 4:
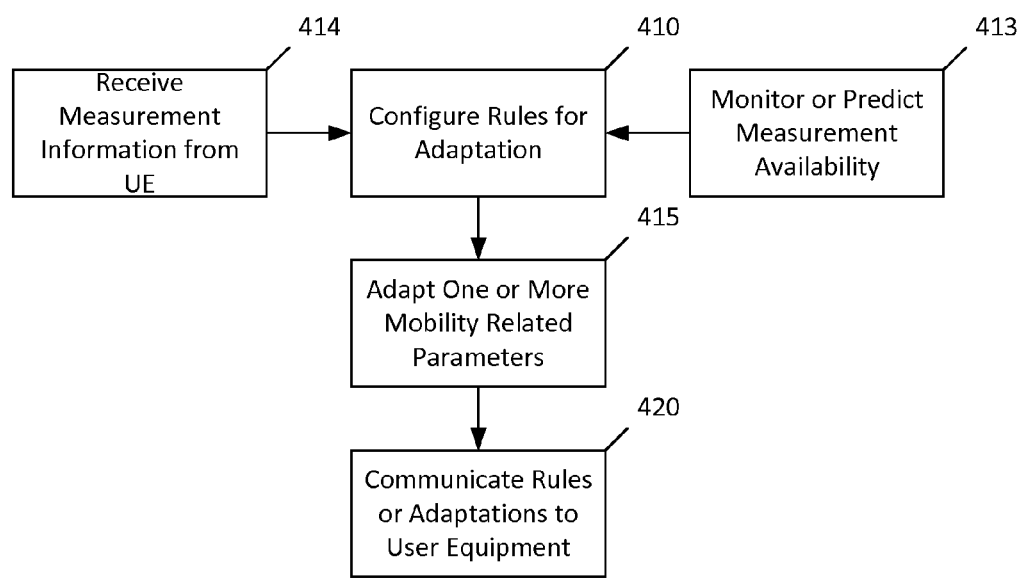
FIG. 4 illustrates another method according to certain embodiments.

FIG. 4 illustrates another method according to certain embodiments. The method of FIG. 4 can be performed by a network, and more specifically by an element of the network, such as a base station or eNode B or an element of a core network.

As shown in FIG. 4, a method can include, at 410, configuring the rules by which the adaptation is done, for example the separate measurement configurations for high and low measurement availability/rate. The method can also include, at 420, communicating the rules to the user equipment. Alternatively, these rules can be fixed in a specification.

In some embodiments, these rules or parameters may be determined autonomously by the UE e.g. based on the UE measurement capabilities or the history of information of measurement activity, and possibly signaled to the network.

In some embodiments, these rules or parameters (e.g. threshold levels) may be indicated by eNB to UE from a finite set of options or configurations.

Depending on the implementation, at 415, one or several different mobility related parameters can be adapted based on measurement availability/rate. The adapted parameters can include measurement filter coefficient or length, triggering threshold, offset, time-to-trigger, hysteresis and/or event evaluation or triggering interval.

The configuration of the rules and adaptation of the parameters can be based on, at 413, monitoring or predicting measurement availability. Additionally, the network can, at 414, receive measurement information including measurements or information about measurements from the user equipment and can base the configuration and adaptation on such information.

In some embodiments, the user equipment may include information of the filtering or event triggering configuration that used in the measurement report or other signaling based on event triggering. There may be an indication whether high or low measurement availability/rate configuration was used for triggering the event or report. Additionally or alternatively there may be an indication of exact number of measurement samples that was used for evaluating the event triggering condition. A standard can be used to implement certain embodiments. The standard can specify, for example, just the scaling of mobility parameters when the number of recent measurements available is low vs. high. For example, the user equipment can be required to shorten the L3 filter or other measurement filter with a certain factor, thus for example scaling L3 filterCoefficient k, increase/decrease the triggering threshold, offset, time-to-trigger, hysteresis and/or event evaluation or triggering interval by another factor.

In some embodiments there can be more than two levels of measurement availability/rate associated with different sets of mobility parameters. Alternatively or additionally to measurement availability/rate threshold based use of different mobility parameter sets, the mobility parameter values may be scaled based on the measurement availability/rate. In practice this can be implemented and supported by technical specifications in many different ways. The following illustrates a practical example of how it could be realized by support of RRC signaling and the behavioral description above.

One way to include the above-described behavior in configuration in E-UTRAN is illustrated here using the reporting configuration for E-UTRAN from 3GPP TS 36.331 release 9. New fields are high-lighted using event A3 as an example. See FIG. 5, which illustrates reporting configuration according to certain embodiments.

Specifically, as shown in FIG. 5 the information element (IE), ReportConfigEUTRA, can be modified to include a new field, such as a3-Offset-2, which can be an offset value to be used in EUTRA measurement report triggering condition for event a3. The offset can be used when measurement availability per time window is below configured threshold. The actual value can be IE value*0.5 dB. Moreover, the information element can be modified to include a field, timeToTrigger2, which can be a time during which specific criteria for the event need(s) to be met in order to trigger a measurement report. This time can be used when measurement availability per time window is below configured threshold.

Furthermore, the information element can be modified to include a field, threshold-RSRP-2, which can be a second RSRP based threshold for event evaluation. The actual value can be IE value−140 dBm. Additionally, the information element can be modified to include a field, threshold-RSRQ-2, which can be a second RSRQ based threshold for event evaluation. The actual value can be (IE value−40)/2 dB.

In addition, MeasurementAvailabilityThreshold can be defined to refer to a threshold indicating the amount of measurements that needs to be available per MeasurementTimeWindow for selecting between handover parameters set1 and set2. MeasurementTimeWindow can be defined to refer to a time window used for determining the amount of available measurements.

It should be noted that coding and wording are just illustrative examples. Variations on the coding and wording are also permitted.

A definition of when the UE applies parameters for different measurement availabilities/rates can also be provided. This definition can be specified in many ways and it can depend on one or more of the following. For example, the UE can apply parameters for different measurement availabilities when the UE is having a lower number of measurements available for mobility evaluation per time period than a given threshold, when the UE is applying DRX longer then a given threshold, when the UE is in low/high mobility state, when the UE is served by a macro cell/small cell/pico cell/femto cell, or when the UE is slow/fast moving. These options can be used alone or in combination with one another.

Figure 6:
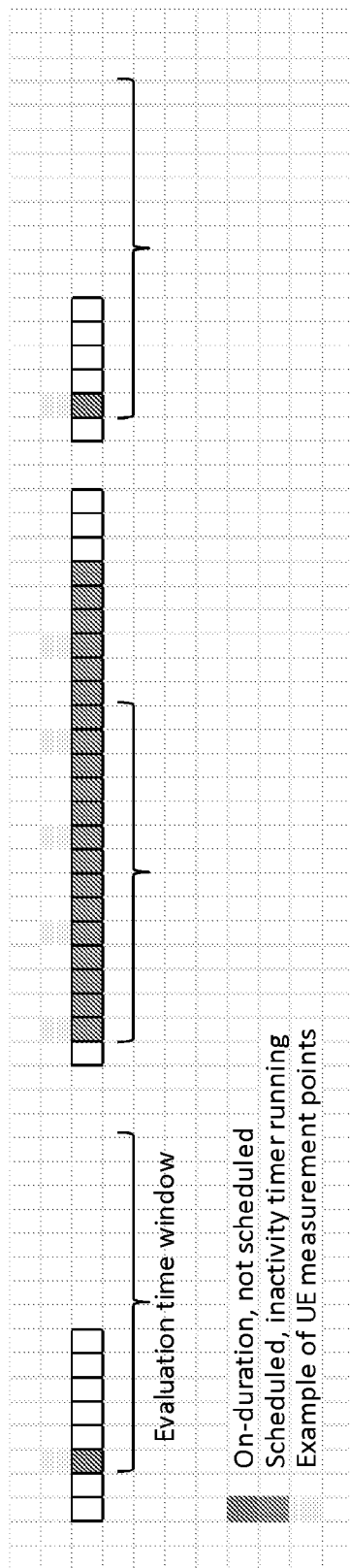
FIG. 6 illustrates an embodiment in which a UE is configured with long DRX of 640 ms, no Short DRX, and a long inactivity timer of 200 ms.

FIG. 6 illustrates an embodiment in which a UE is configured with long DRX of 640 ms, no short DRX, and a long inactivity timer of 200 ms. In this case, the UE can easily know or predict when to apply which set of mobility parameters based simply on whether the UE is scheduled or not.

In one implementation alternative, the handover events can be re-evaluated when the UE switches from one set of mobility parameters to another, even though no new measurement samples have been obtained since the previous evaluation of events. If a UE switches to a mobility parameter set configured for low measurement availability, the UE may re-evaluate the handover events according to the new parameters using recent, existing measurement samples without waiting for further measurement samples to be collected at a low rate. Or if the UE goes to DRX and it is known that most likely, unless there is for example unexpected uplink (UL) traffic, no further measurement samples will be obtained until the next DRX cycle, the UE may switch the mobility parameter set immediately if it would anyway be switched before the next measurement sample.

In another example, the mobility parameter set to be used, and the corresponding handover events, can be re-evaluated when there is an absence of a measurement sample. For example, the re-evaluation can take place when the UE would have obtained another measurement sample, but the measurement was omitted due to DRX. This may happen for example when the UE has been performing measurements at regular intervals, but then at some point of time the UE does not perform the expected measurement due to e.g. DRX.

Figure 7:
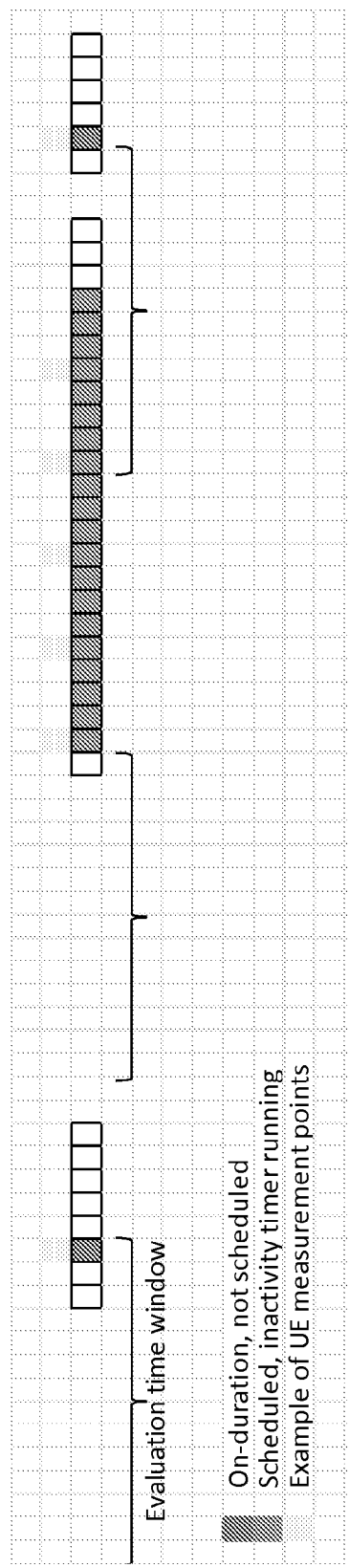
FIG. 7 illustrates another embodiment, in which the UE is configured with long DRX of 640 ms and short inactivity timer.

FIG. 7 illustrates another embodiment, in which the UE is configured with long DRX of 640 ms and short inactivity timer. In this case the UE can use the history of measurement samples available in order to decide which set of mobility parameters to apply.

In certain embodiments mobility parameter settings for UE measurements can take into account the UE measurement availability. Thus, UE can change the parameter setting on the go without reconfiguration from the network. These embodiments can contribute to robustness of mobility and/or power saving, because fewer measurements may be necessary when the UE has low traffic, in view of the fact that the mobility parameters can adapt to the varying measurement availability.

Figure 8:
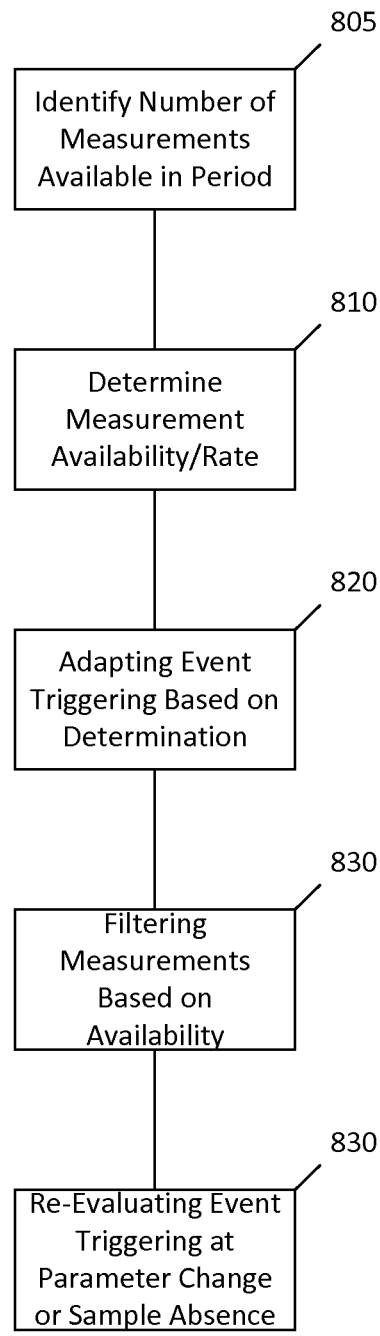
FIG. 8 illustrates another method according to certain embodiments.

FIG. 8 illustrates a method according to certain embodiments. The method of FIG. 8 may be performed by, for example, a user equipment. The method of FIG. 8 can include, at 810, determining at least one of measurement rate or measurement availability. The determining can include determining a number of a plurality of measurements available for making a handover decision or triggering a measurement event or sending of a measurement report.

The determining can include monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window, or configured discontinuous reception parameters.

The method can also include, at 820, adapting an event triggering depending on at least one of the measurement rate or the measurement availability. The event triggering can include triggering a handover or sending a measurement report or other signaling containing information of the event to the network.

The adapting can be performed when the measurement rate or the measurement availability is above a threshold or below a threshold. The adapting can include scaling the mobility or filtering parameters based on the measurement rate or the measurement availability. The adapting can include adapting at least one of a filtering value, a measurement report trigger value, a threshold value, or a hysteresis value. The adapting can include adapting autonomously or adapting under guidance of a network. The adapting can include adapting the event triggering depending on a currently applied discontinuous reception status. Adapting under guidance of a network can mean that network configures the rules or parameters based on which the adaptation is done. Adapting under guidance of a network can also mean that network determines the measurement availability or likely measurement availability for example based on DRX activity of the UE, or receives signaling indicating the measurement availability from the UE, and based on the measurement availability then reconfigures the mobility parameters of the UE. Adapting autonomously can mean that UE is adapting based on specified rules and/or parameters, or that the UE autonomously determines the rules and/or parameters based on its activity.

The adapting the event triggering can further be based on at least one of the user equipment having a lower number of measurements available for mobility evaluation per time period than a given threshold, the user equipment applying discontinuous reception longer then a given threshold, the user equipment being in a low mobility state, the user equipment being in a high mobility, the user equipment being slow moving, or the user equipment being fast moving, the user equipment being connected to a certain cell or cell type, e.g. a small cell or a macro cell.

The method can also include, at 805, identifying the number of the plurality of measurements available over at least one of a fixed time duration or one or more DRX cycles. The method can further include, at 830, filtering measurements depending on the amount of available measurements per time window. The filtering can be a way in which the adapting is implemented. The method can additionally include, at 840, re-evaluating the event triggering when the user equipment switches from one set of mobility parameters to another or when there is an absence of a measurement sample.

Figure 9:
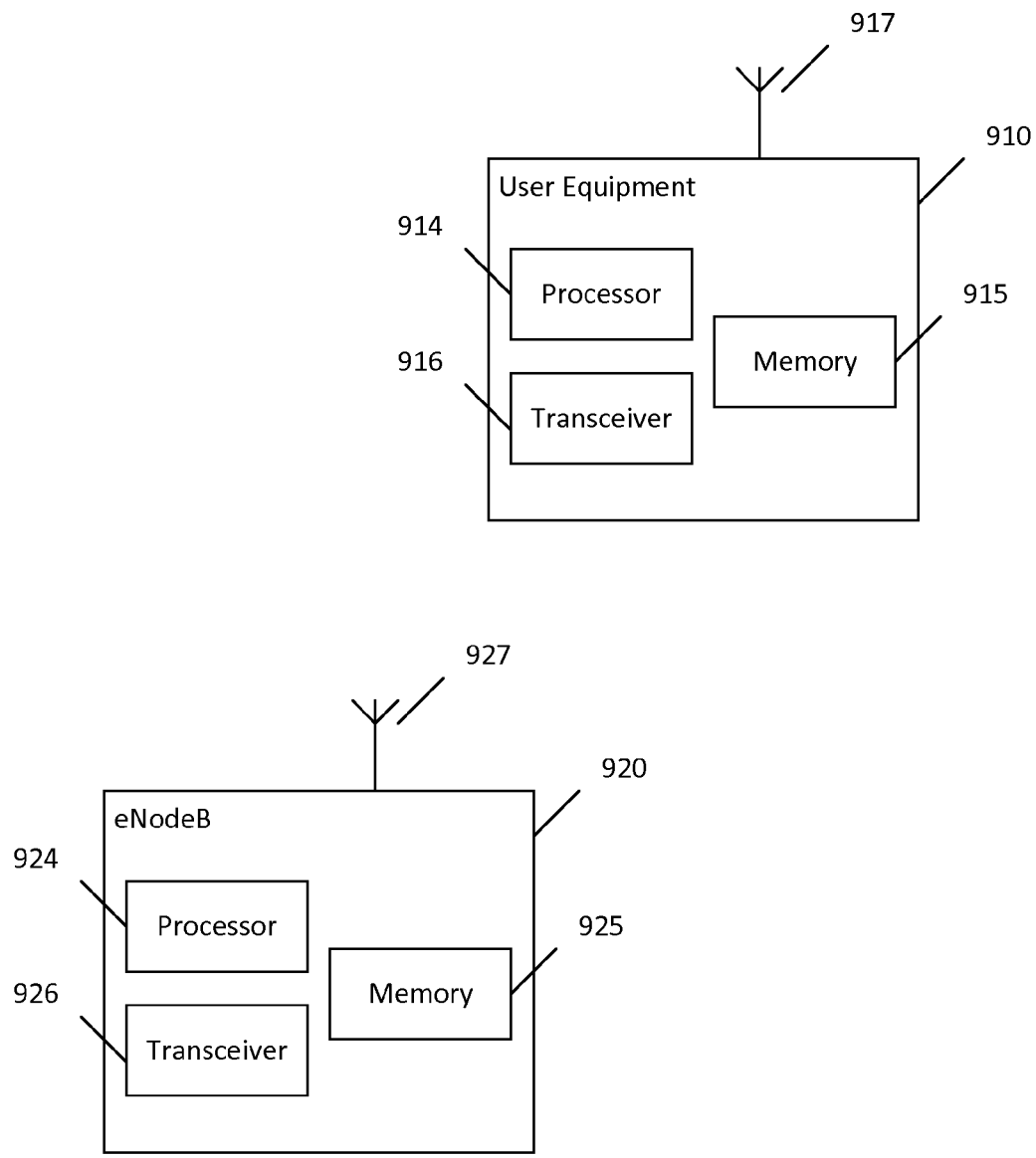
FIG. 9 illustrates a system according to certain embodiments.

FIG. 9 illustrates a system according to certain embodiments. In an example embodiment, a system may include two devices, user equipment (UE) 910 and eNodeB 920. Each of the devices 910 and 920 may be equipped with at least one processor (respectively 914 and 924), at least one memory (respectively 915 and 925) (including computer program instructions or code), a transceiver (respectively 916 and 926), and an antenna (respectively 917 and 927). There is no requirement that each of these devices be so equipped. For example, the eNodeB 920 may be equipped for wired communication with a core network (not shown).

The transceiver (respectively 916 and 926) can be a transmitter, a receiver, both a transmitter and a receiver, or a unit that is configured both for transmission and reception. The transceiver (respectively 916 and 926) can be coupled to corresponding one or more antenna(s) (respectively 917 and 927), which may include a directional antenna.

The at least one processor (respectively 914 and 924) can be variously embodied by any computational or data processing device, such as a central processing unit (CPU) or application specific integrated circuit (ASIC). The at least one processor (respectively 914 and 924) can be implemented as one or a plurality of controllers.

The at least one memory (respectively 915 and 925) can be any suitable storage device, such as a non-transitory computer-readable medium. For example, a hard disk drive (HDD) or random access memory (RAM) can be used in the at least one memory (respectively 915 and 925). The at least one memory (respectively 915 and 925) can be on a same chip as the corresponding at least one processor (respectively 914 and 924), or may be separate from the corresponding at least one processor (respectively 914 and 924).

The computer program instructions may be any suitable form of computer program code. For example, the computer program instructions may be a compiled or interpreted computer program.

The at least one memory (respectively 915 and 925) and computer program instructions can be configured to, with the at least one processor (respectively 914 and 924), cause a hardware apparatus (for example, user equipment 910 or eNodeB 920) to perform a process, such as any of the processes described herein (see, for example, FIGS. 3, 4, and 8).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of user equipment 910 and eNodeB 920 can include a user interface that is operable connected to the processor (respectively 914 and 924) and memory (respectively 915 and 925). That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that the devices include a user interface. For example, the eNodeB 920 may be embodied in part as a rack-mounted computer.

The devices of the system can also include peripheral devices that are connected wirelessly by, for example, a short-range wireless connection. Thus the devices of the system can be configured with more than one radio system, and can be configured for operation in more than one mode.

Although FIG. 9 illustrates a system including a base station and a terminal device, certain embodiments may be applicable to other embodiments. For example, certain embodiments may be applicable to device to device communications between terminals in a cluster or other arrangement.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

A method, according to certain embodiments, includes determining at least one of measurement rate or measurement availability. The method also includes adapting at least one of an event triggering or a measurement filtering, depending on at least one of the measurement rate or the measurement availability.

The adapting can be performed when the measurement rate or the measurement availability is above a threshold or below a threshold.

The adapting can be performed by scaling the event triggering or filtering parameters based on the measurement rate or the measurement availability.

The determining can include determining a number of a plurality of measurements available for making a handover decision.

The determining can include determining a number of a plurality of measurements available for evaluating an event triggering condition that may cause a report to be sent from a user equipment.

The method can also include measuring the number of the plurality of measurements available over at least one of a fixed time duration or one or more discontinuous reception cycles.

The adapting can include adapting at least one of a filtering value, a filter length, a filter coefficient, a measurement report trigger value, a threshold time to trigger value, or a hysteresis value.

The adapting can include adapting autonomously or adapting under guidance of a network.

The event triggering can include triggering a handover.

The event triggering can include sending from a user equipment a measurement report or other signaling based on an event condition being fulfilled.

The method can further include filtering measurements depending on the amount of available measurements per time window.

The adapting can include adapting the event triggering depending on a currently applied discontinuous reception status or configuration.

The method can further include re-evaluating the event triggering when the user equipment switches from one set of mobility parameters to another or when there is an absence of a measurement sample.

The adapting the event triggering can further be based on at least one of the user equipment having a lower number of measurements available for mobility evaluation per time period than a given threshold, the user equipment applying discontinuous reception longer than a given threshold, the user equipment being in a low mobility state, the user equipment being in a high mobility, the user equipment being slow moving, or the user equipment being fast moving.

The determining can include monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window, or configured discontinuous reception parameters.

A method according to certain embodiments includes adapting one or more mobility parameters based on measurement availability or measurement rate. The method also includes communicating the rules or adaptations to the rules to a user equipment.

The method can include configuring the rules by which the adaptation is done.

The method can further include monitoring or predicting measurement availability or measurement rate for the user equipment.

The method can additionally include receiving measurement information from the user equipment.

An apparatus, according to certain embodiments, includes at least one processor and at least one memory including computer program code. The at least one memory and the computer program code are configured to, with the at least one processor, cause the apparatus at least to determine at least one of measurement rate or measurement availability. The at least one memory and the computer program code are also configured to, with the at least one processor, cause the apparatus at least to adapt at least one of an event triggering or a measurement filtering depending on at least one of the measurement rate or the measurement availability.

The at least one memory and the computer program code can be configured to, with the at least one processor, cause the apparatus at least to perform the adapting when the measurement rate or the measurement availability is above a threshold or below a threshold.

The at least one memory and the computer program code can be configured to, with the at least one processor, cause the apparatus at least to perform the adapting by scaling the event triggering or filtering parameters based on the measurement rate or the measurement availability.

The at least one memory and the computer program code can be configured to, with the at least one processor, cause the apparatus at least to determine a number of a plurality of measurements available for making a handover decision.

The at least one memory and the computer program code can be configured to, with the at least one processor, cause the apparatus at least to determine a number of a plurality of measurements available for evaluating an event triggering condition that may cause a report to be sent from UE.

The at least one memory and the computer program code can be configured to, with the at least one processor, cause the apparatus at least to measure the number of the plurality of measurements available over at least one of a fixed time duration or one more discontinuous reception cycles.

The at least one memory and the computer program code can be configured to, with the at least one processor, cause the apparatus at least to adapt at least one of a filtering value, a filter length, a filter coefficient, a measurement report trigger value, a threshold time to trigger value, or a hysteresis value.

The at least one memory and the computer program code can be configured to, with the at least one processor, cause the apparatus at least to adapt autonomously or adapt under guidance of a network.

The at least one memory and the computer program code can be configured to, with the at least one processor, cause the apparatus at least to trigger the event by triggering a handover.

The at least one memory and the computer program code can be configured to, with the at least one processor, cause the apparatus at least to send from the user equipment a measurement report or other signaling based on an event condition being fulfilled when triggering the event.

The at least one memory and the computer program code can be configured to, with the at least one processor, cause the apparatus at least to filter measurements depending on the amount of available measurements per time window.

The at least one memory and the computer program code can be configured to, with the at least one processor, cause the apparatus at least to adapt the event triggering depending on a currently applied discontinuous reception status or configuration.

The at least one memory and the computer program code can be configured to, with the at least one processor, cause the apparatus at least to re-evaluate the event triggering when the user equipment switches from one set of mobility parameters to another or when there is an absence of a measurement sample.

The at least one memory and the computer program code can be configured to, with the at least one processor, cause the apparatus at least to adapt the event triggering based on at least one of the user equipment having a lower number of measurements available for mobility evaluation per time period than a given threshold, the user equipment applying discontinuous reception longer than a given threshold, the user equipment being in a low mobility state, the user equipment being in a high mobility, the user equipment being slow moving, or the user equipment being fast moving.

The at least one memory and the computer program code can be configured to, with the at least one processor, cause the apparatus at least to monitor availability based on at least one of previously observed measurement activity, known or predicted near-future measurement availability, a number of measurement opportunities during a certain time window, a number of active subframes the user equipment has had during at least one previous discontinuous reception cycle or predetermined time window, or configured discontinuous reception parameters.

An apparatus, in certain embodiments, includes at least one processor and at least one memory including computer program code. The at least one memory and the computer program code are configured to, with the at least one processor, cause the apparatus at least to adapt one or more mobility parameters based on measurement availability or measurement rate. The at least one memory and the computer program code are configured to, with the at least one processor, cause the apparatus at least to communicate the rules or adaptations to the rules to a user equipment.

The at least one memory and the computer program code can be configured to, with the at least one processor, cause the apparatus at least to configure the rules by which the adaptation is done.

The at least one memory and the computer program code can be configured to, with the at least one processor, cause the apparatus at least to monitor predicting measurement availability or measurement rate for the user equipment.

The at least one memory and the computer program code can be configured to, with the at least one processor, cause the apparatus at least to receive measurement information from the user equipment.

In certain embodiments, a non-transitory computer-readable medium is encoded with instructions that, when executed in hardware, perform a process. The process includes determining at least one of measurement rate or measurement availability. The process also includes adapting at least one of an event triggering or a measurement filtering depending on at least one of the measurement rate or the measurement availability.

The adapting can be performed when the measurement rate or the measurement availability is above a threshold or below a threshold.

The adapting can be performed by scaling the event triggering or filtering parameters based on the measurement rate or the measurement availability.

The determining can include determining a number of a plurality of measurements available for making a handover decision.

The determining can include determining a number of a plurality of measurements available for evaluating an event triggering condition that may cause a report to be sent from a user equipment.

The process can also include measuring the number of the plurality of measurements available over at least one of a fixed time duration or one or more discontinuous reception cycles.

The adapting can include adapting at least one of a filtering value, a filter length, a filter coefficient, a measurement report trigger value, a threshold time to trigger value, or a hysteresis value.

The adapting can include adapting autonomously or adapting under guidance of a network.

The event triggering can include triggering a handover.

The event triggering can include sending from a user equipment a measurement report or other signaling based on an event condition being fulfilled.

The process can further include filtering measurements depending on the amount of available measurements per time window.

The adapting can include adapting the event triggering depending on a currently applied discontinuous reception status or configuration.

The process can further include re-evaluating the event triggering when the user equipment switches from one set of mobility parameters to another or when there is an absence of a measurement sample.

The adapting the event triggering can further be based on at least one of the user equipment having a lower number of measurements available for mobility evaluation per time period than a given threshold, the user equipment applying discontinuous reception longer than a given threshold, the user equipment being in a low mobility state, the user equipment being in a high mobility, the user equipment being slow moving, or the user equipment being fast moving.

The determining can include monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window, or configured discontinuous reception parameters.

According to certain embodiments, a non-transitory computer-readable medium is encoded with instructions that, when executed in hardware, perform a process. The process includes adapting one or more mobility parameters based on measurement availability or measurement rate. The process also includes communicating the rules or adaptations to the rules to a user equipment.

The process can include configuring the rules by which the adaptation is done.

The process can further include monitoring or predicting measurement availability or measurement rate for the user equipment.

The process can additionally include receiving measurement information from the user equipment.

An apparatus, according to certain embodiments, includes determining means for determining at least one of measurement rate or measurement availability. The apparatus also includes adapting means for adapting at least one of an event triggering or a measurement filtering depending on at least one of the measurement rate or the measurement availability.

The adapting can be performed when the measurement rate or the measurement availability is above a threshold or below a threshold.

The adapting can be performed by scaling the event triggering or filtering parameters based on the measurement rate or the measurement availability.

The determining can include determining a number of a plurality of measurements available for making a handover decision.

The determining can include determining a number of a plurality of measurements available for evaluating an event triggering condition that may cause a report to be sent from a user equipment.

The apparatus can also include measuring means for measuring the number of the plurality of measurements available over at least one of a fixed time duration or one more discontinuous reception cycles.

The adapting can include adapting at least one of a filtering value, a filter length, a filter coefficient, a measurement report trigger value, a threshold time to trigger value, or a hysteresis value.

The adapting can include adapting autonomously or adapting under guidance of a network.

The event triggering can include triggering a handover.

The event triggering can include sending from a user equipment a measurement report or other signaling based on an event condition being fulfilled.

The apparatus can further include filtering means for filtering measurements depending on the amount of available measurements per time window.

The adapting can include adapting the event triggering depending on a currently applied discontinuous reception status or configuration.

The apparatus can further include re-evaluating means for re-evaluating the event triggering when the user equipment switches from one set of mobility parameters to another or when there is an absence of a measurement sample.

The adapting the event triggering can further be based on at least one of the user equipment having a lower number of measurements available for mobility evaluation per time period than a given threshold, the user equipment applying discontinuous reception longer than a given threshold, the user equipment being in a low mobility state, the user equipment being in a high mobility, the user equipment being slow moving, or the user equipment being fast moving.

The determining can include monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window, or configured discontinuous reception parameters.

An apparatus according to certain embodiments includes adapting means for adapting one or more mobility parameters based on measurement availability or measurement rate. The apparatus also includes communicating means for communicating the rules or adaptations to the rules to a user equipment.

The apparatus can include configuring means for configuring the rules by which the adaptation is done.

The apparatus can further include monitoring means for monitoring or predicting measurement availability or measurement rate for the user equipment.

The apparatus can additionally include receiving means for receiving measurement information from the user equipment.

GLOSSARY OF ABBREVIATIONS

UE User Equipment
EDDA Enhancements for diverse data applications
SPO Smart Phone Optimization
LTE Long Term Evolution
DRX Discontinuous Reception
RRC Radio Resource Control
E-UTRAN Evolved Universal Terrestrial Radio Access Network
RRM Radio Resource Management
EPC Evolved Packet Core
RLF Radio Link Failure
FTP File Transfer Protocol
BSR Buffer Status Report
PDCCH Physical Downlink Control Channel
RB Resource Block
RSRP Reference signal received power
RSRQ Reference signal received quality

We claim:

1. A method, comprising:
   determining at least one of measurement rate or measurement availability; and
   adapting at least one of an event triggering or a measurement filtering, depending on at least one of the measurement rate or the measurement availability,
   wherein the determining comprises monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window and configured discontinuous reception parameters.

2. The method of claim 1, wherein the adapting is performed when the measurement rate is at least one of above a first threshold and below a second threshold, when the measurement availability is at least one of above a first threshold and below a second threshold, or when both the measurement rate and the measurement availability are at least one of above a first threshold and below a second threshold.

3. The method of claim 1, wherein the determining comprises at least one of: determining a number of a plurality of measurements available for making a handover decision and determining a number of a plurality of measurements available for evaluating an event triggering condition that may cause a report to be sent from a user equipment.

4. The method of claim 1, further comprising:
   measuring the number of the plurality of measurements available over at least one of a fixed time duration or one or more discontinuous reception cycles.

5. The method of claim 1, wherein the adapting comprises adapting at least one of a filtering value, a filter length, a filter coefficient, a measurement report trigger value, a threshold time to trigger value, or a hysteresis value.

6. The method of claim 1, wherein the adapting comprises at least one of: adapting autonomously; adapting under guidance of a network, selecting between predetermined sets of parameters and adapting the event triggering depending on a currently applied discontinuous reception status or configuration.

7. The method of claims 1, wherein the event triggering comprises at least one of: triggering a handover and sending from a user equipment a measurement report or other signaling based on an event condition being fulfilled.

8. The method of claim 1, wherein the adapting the event triggering is further be based on at least one of the user equipment having a lower number of measurements available for mobility evaluation per time period than a given threshold, the user equipment applying discontinuous reception longer than a given threshold, the user equipment being in a low mobility state, the user equipment being in a high mobility, the user equipment being slow moving and the user equipment being fast moving.

9. A method, comprising:
adapting one or more mobility parameters based on measurement availability or measurement rate; and
communicating the rules or adaptations to the rules to a user equipment,
wherein the adapting one or more mobility parameters based on measurement availability or measurement rate comprises adapting at least one mobility parameter by selecting between predetermined sets of parameters.

10. The method of claim 9, further comprising at least one of:
configuring the rules by which the adaptation is done at least one of monitoring, predicting measurement availability and measurement rate for the user equipment; and receiving measurement information from the user equipment.

11. An apparatus, comprising:
at least one processor; and
at least one memory including computer program code,
wherein the at least one memory and the computer program code are configured to, with the at least one processor, cause the apparatus at least to
determine at least one of measurement rate and measurement availability; and
adapt at least one of an event triggering and a measurement filtering depending on at least one of the measurement rate and the measurement availability,
wherein the at least one memory and the computer program code are configured to, with the at least one processor, cause the apparatus at least to determine the at least one of measurement rate and measurement availability by at least monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window and configured discontinuous reception parameters.

12. The apparatus of claim 11, wherein the at least one memory and the computer program code are configured to, with the at least one processor, cause the apparatus at least to perform the adapting when at least one of the measurement rate and the measurement availability is at least one of above a first threshold and below a second threshold.

13. The apparatus of claim 11, wherein the at least one memory and the computer program code are configured to, with the at least one processor, cause the apparatus at least to determine a number of a plurality of measurements available for at least one of making a handover decision and evaluating an event triggering condition that may cause a report to be sent from a user equipment.

14. The apparatus of claim 11, wherein the at least one memory and the computer program code are configured to, with the at least one processor, cause the apparatus at least to measure the number of the plurality of measurements available over at least one of a fixed time duration and at least one discontinuous reception cycle.

15. The apparatus of claim 11, wherein the at least one memory and the computer program code are configured to, with the at least one processor, cause the apparatus at least to filter measurements depending on the amount of available measurements per time window.

16. An apparatus, comprising:
at least one processor; and
at least one memory including computer program code,
wherein the at least one memory and the computer program code are configured to, with the at least one processor, cause the apparatus at least to
adapt one or more mobility parameters based on measurement availability or measurement rate; and
communicate the rules or adaptations to the rules to a user equipment,
wherein the at least one memory and the computer program code are configured to, with the at least one processor, cause the apparatus at least to adapt at least one mobility parameter by selecting between predetermined sets of parameters.

17. A non-transitory computer-readable medium encoded with instructions that, when executed in hardware, perform a process, the process comprising the method of claim 1.

18. A system comprising:
a first apparatus comprising adapting means for adapting one or more mobility parameters based on measurement availability or measurement rate and communicating means for communicating the rules or adaptations to the rules to a second apparatus, wherein the adapting one or more mobility parameters based on measurement availability or measurement rate comprises adapting at least one mobility parameter by selecting between predetermined sets of parameters; and
the second apparatus comprising determining means for determining at least one of measurement rate or measurement availability and adapting means for adapting at least one of an event triggering or a measurement filtering depending on at least one of the measurement rate or the measurement availability, wherein the determining comprises monitoring availability based on at least one of previously observed measurement activity, known or predicted near-future measurement availability, a number of measurement opportunities during a certain time window, a number of active subframes the user equipment has had during at least one previous discontinuous reception cycle or predetermined time window and configured discontinuous reception parameters.

* * * * *